United States Patent Office 3,197,053
Patented July 27, 1965

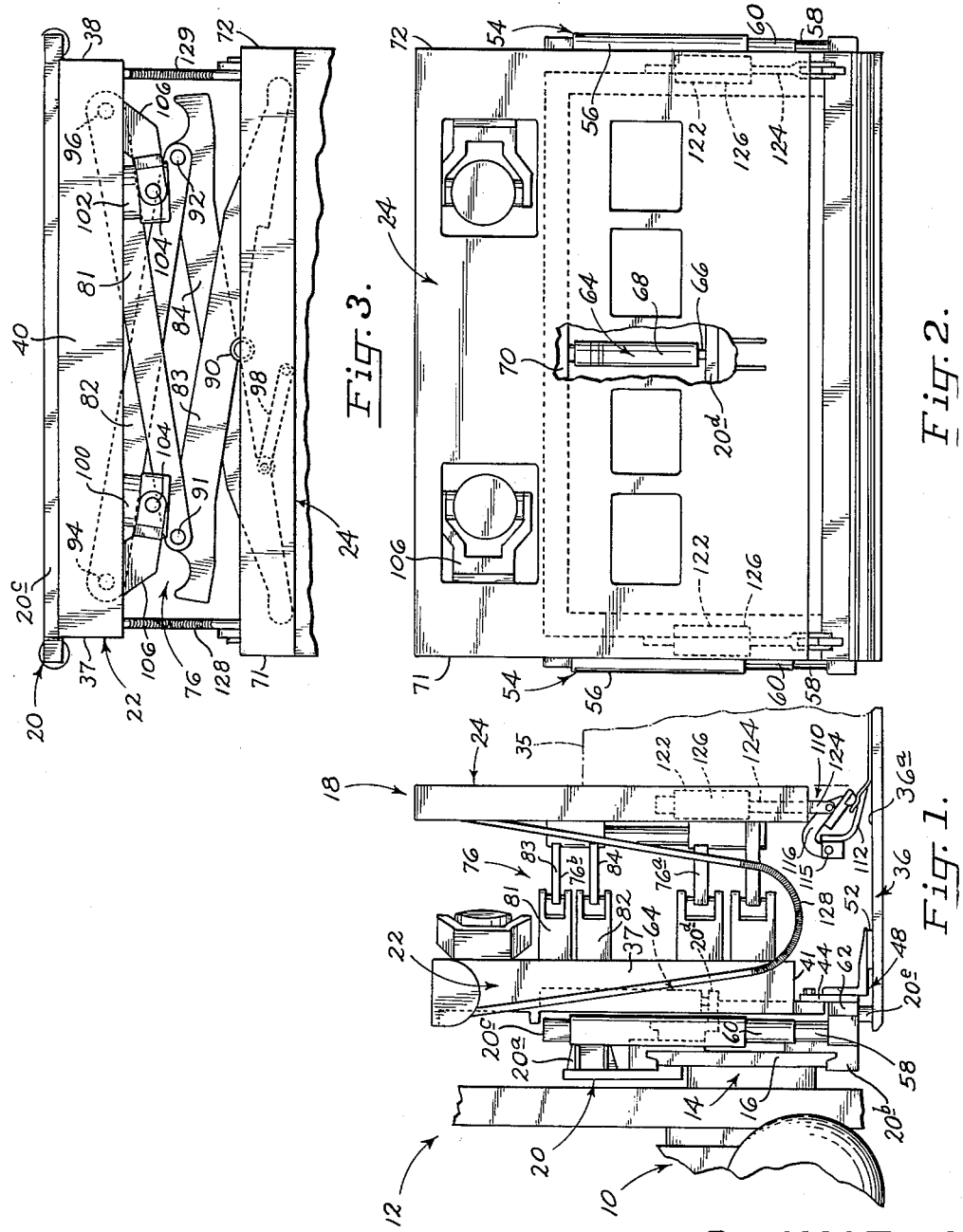

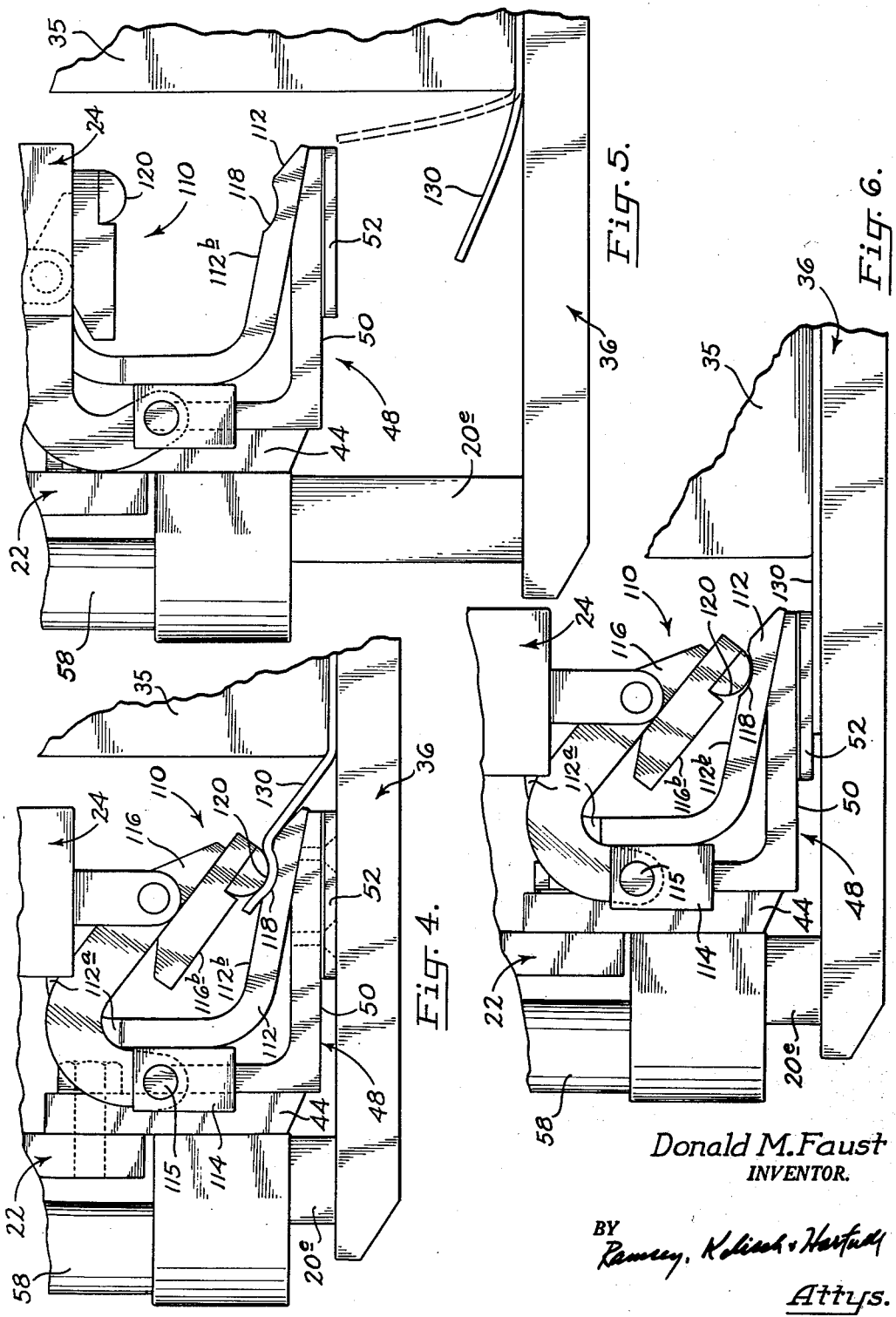

3,197,053
ARTICLE-HANDLING APPARATUS WITH PUSHER AND ANCHOR MEANS MOUNTED ON A VERTICALLY MOVABLE SUBFRAME
Donald M. Faust, Estacada, Oreg., assignor, by mesne assignments, to Cascade Corporation, a corporation of Oregon
Filed Aug. 23, 1962, Ser. No. 218,890
6 Claims. (Cl. 214—514)

This invention relates generally to article-handling apparatus, and more particularly to apparatus for an industrial truck featuring support means for supporting a load, means for pulling the edge of a pallet with a load supported thereon onto said support means, and means for then anchoring the edge of a pallet on said support means whereby the load may subsequently be pushed off the top of the pallet to separate the load and pallet.

One way of handling articles, such as packages and the like, is to stack them on a thin, sheet-like pallet, which may be a sheet of cardboard or other material. The articles may then be transported from one place to another, by pulling the sheet-like pallet onto a suitable movable support, such as a load-supporting platform carried adjacent the forward end of an industrial truck. On sliding the sheet-like pallet onto the platform, the articles stacked thereon are shifted onto the platform together with the pallet. The articles, together with the pallet, may then be deposited at a suitable location, by sliding the pallet and the articles stacked thereon off the load-supporting platform.

In certain handling operations, it is desirable to shift the articles off such a load-supporting platform, while retaining the pallet on the platform, so that only the articles are unloaded. Thus, as when loading a freight car and the like, it may be desirable to load the car with stacked articles resting directly on the floor of the car instead of on the pallets used in moving the articles. Broadly speaking, this invention concerns, and has for one of its principal objects, the provision of novel means for anchoring the edge of a pallet on a load-supporting platform, whereby such separation of a stack of articles from the pallet upon which they are supported, may be accomplished.

More specifically, an object of this invention is to provide article-handling apparatus of the type hereinabove indicated, including means for supporting a load, such as a platform, that further comprises a first jaw mechanism adjacent the rear of said platform, for anchoring onto the edge of a pallet, a second jaw mechanism extensible from the first and movable to and fro over the platform, for shifting the pallet onto the platform, and means for effecting a transfer of the edge of a pallet from the second to the first jaw mechanism.

Another object is to provide novel article-handling apparatus, for industrial trucks and the like, that includes a platform and an elongated transversely extending clamping means adjacent the rear thereof, for holding onto the edge of a pallet, such being shiftable downwardly from a raised position whereby the edge of a pallet shifted thereunder may be gripped by the clamping means.

Another object is to provide article-handling apparatus, which includes an extensible jam mechanism movable over a support for a load, another jaw mechanism adjacent the rear of said support, and a mounting for the two jaw mechanisms whereby they both may be raised to enable the edge of a pallet to position itself adjacent under the lower of the two jaw mechanisms.

Still another object is to provide compact article-handling apparatus, operable to perform the functions above indicated, which is simple, practical, and trouble-free in operation.

These and other objects and advantages are attained by the invention, and the same is described hereinbelow in conjunction with the accompanying drawings, wherein:

FIG. 1 is a side elevation of an embodiment of the invention, in this instance illustrating an attachment for an industrial truck, such attachment including a load-supporting platform secured to a vertically shiftable carriage, a load pusher movable over the top of said platform for pushing a load off the platform, and a pair of jaw mechanisms used in gripping the edge of a pallet, as contemplated herein;

FIG. 2 is a front view, with portions removed, of the attachment shown in FIG. 1;

FIG. 3 is a top, plan view of portions of the apparatus illustrated in FIGS. 1 and 2;

FIG. 4 is a view, on a slightly enlarged scale, illustrating portions of the apparatus shown in FIG. 1, with the apparatus in one of its adjusted positions; and FIGS. 5 and 6 are views similar to FIG. 4, but showing the apparatus in other adjusted positions.

Referring now to the drawings, and first of all more particularly to FIGS. 1, 2, and 3, here there is indicated at 10 portions of an industrial truck, more specifically a lift truck, provided with load-lifting structure at the forward end thereof, such load-lifting structure comprising an extensible mast structure 12 and a carriage 14 mounted on the extensible mast structure for movement vertically therealong. Positioned forwardly of mast structure 12, and mounted thereon through a plate 16 mounted on carriage 14, is article-handling mechanism as contemplated by this invention, indicated generally at 18.

Article-handling apparatus 18 is of the type that may be used to transport articles stacked on sheet-like pallets, such as sheets of cardboard, with such articles loaded onto the apparatus by sliding the pallet upon which the articles are stacked into loaded position thereon. Since the article-handling apparatus is mounted on carriage 14, the same may be shifted vertically to raise the apparatus from the ground as would be done when it is desired to move a load from one place to another. For loading and unloading purposes, the apparatus is lowered to the ground, generally to the position shown in FIG. 1.

Describing now more particularly article-handling apparatus 18, in broad terms the apparatus comprises a frame section 20 which is mounted on plate 16, and in front of frame section 20 and guided for vertical movement thereon a mounting or subframe 22. Mounted on subframe or mounting 22, and extensible forwardly therefrom is a load pusher 24, also referred to herein as a face plate means.

Frame section 20 comprises portions 20a, 20b mounted on opposite sides of plate 16 and joined by suitable structure (not shown). Also part of the frame section and visible in FIG. 1 is a cross piece 20c adjacent the top thereof, a mounting bracket 20d (see FIGS. 1 and 2) disposed approximately centrally of the frame section, and a heel plate 20e adjacent the bottom of the apparatus. These various parts are, of course, integrally joined to make a solid structure.

Secured to frame section 20 through part 20e, in a fixed position on and adjacent the base of the frame, is support or support means 36 for a load such as load 35. Support 36 may take the form of an expansive, relatively thin plate or platen, with a top surface 36a defining a substantially horizontal supporting plane for load 35.

Subframe or mounting 22 comprises a box-type structure, and is located forwardly of the frame section 20 over load-supporting platen 36. The subframe includes sides 37, 38 and top and bottom plates 40, 41, which together with the sides define a substantially rectangular outline for the subframe. Along the base of the subframe and fastened thereto is a depending plate portion 44.

Secured to depending plate portion, and thus integral with the subframe, is a jaw mechanism or means indicated generally at 48.

Describing jaw means 48 more specifically, and referring now also to FIGS. 4, 5 and 6, it comprises an elongated gripper bar having a substantially L-shaped profile disposed substantially parallel to the top of platen 36. The bar extends across the top of the platen and has ends adjacent opposite sides of the platen. Fastened to bottom surface 50 of the gripper bar is an elongated, high coefficient of friction pad 52, that extends substantially the length of the bar.

Mounting or subframe 22 is mounted on frame section 20 for vertical movement relative to the frame section and the platen thereunder. Thus, on either side of the apparatus (see FIGS. 1 and 2) is a telescopic guide or guide mechanism 54. Each guide mechanism comprises a tube 56 which is fastened to frame section 20, and a rod 58 extensible from the bottom of tube 56. A bushing 60 slidably mounts rod 58 for a movement longitudinally of tube 56. Securing the bottom ends of rods 58 to subframe 22 (through plate 44) are parts 62.

Mechanisms 54 on either side of the apparatus guide each side of the subframe for up and down movement relative to frame section 20. A power-operated means, more specifically a double-acting ram 64, produces relative vertical movement between the subframe and frame section 20, and also constitutes a means for holding the subframe in a given position relative to frame section 20.

In the embodiment illustrated, ram 64 is located midway between the sides of frame section 20. The ram includes a rod 66 that extends outwardly from the lower end of a ram cylinder 68, rod 66 being fastened to mounting bracket 20d of frame section 20. Ram cylinder 68 is fastened to member 70 disposed thereabove, which is part of subframe or mounting 22. Suitable valve means (not shown) is provided for admitting fluid under pressure either to the bottom or top end of the ram cylinder. On extension of the ram, and referring to FIG. 2, cylinder 68 moves upwardly with raising of the subframe and the gripper bar at the base thereof relative to the frame section.

Load pusher 24 may take the form of a substantially rectangular, perpendicularly disposed rack disposed above platen 36. The rack extends across the top of the platen, and has opposite sides 71, 72 adjacent opposite sides of the platen. Mounting the rack on subframe or mounting 22 is extensible means 76, with ends mounted on the subframe and rack, respectively.

More specifically, extensible means 76 comprises pantograph structure, with upper and lower sections best illustrated in FIG. 1, and indicated at 76a, 76b. The sections are similar in construction. Thus, section 76a comprises four rigid arms, indicated for section 76a at 81, 82, 83, and 84, jointed in parallelogram form, such joints being indicated at 90, 91, and 92. (See FIG. 3).

Arms 81, 82 have their rear ends joined to upright shafts 94, 96 journaled in subframe 22. The forward ends of arms 83, 84 are slidably received within runways (not shown) provided in the back of the rack. A pivoted anchor link 98, pivoted to arm 84 and the rack, centers the rack against the front ends of arms 83, 84. On retraction of mechanism 76, the rack also is retracted.

Power-operated means is provided for producing extension of structure 76. Thus, and with reference to FIG. 3, 100 and 102 indicate a pair of double-acting rams, with rod ends (not shown) suitably connected to subframe or mounting 22. The cylinder ends of these rams are pivotally connected, at 104 to levers 106, which are joined to shafts 94, 96. On extension of the rams, the ends of levers 106 with connections 104 move away from mounting 22, causing rotation of shafts 94, 96 and movement of arms 81, 82 so that the pantograph structure extends. Contraction of the ram serves to collapse the pantograph structure.

The rack, by reason of its mounting on subframe 22 through structure 76, is guided independently of any structure on the platen. The pantograph structure described enables extension of the rack to a position over the forward or toe end of platen 36, so that a load may be pushed by the rack off the front of the platen. The pantograph structure is also fully collapsible, to enable the parts to reach the relative position shown in FIGS. 4–6, where the rack is snugly adjacent mounting or subframe 22.

It should be noted that pantograph structure 76 has ends connected to the mounting and rack, respectively, and is extensible between these ends, and is disposed inwardly of guide mechanisms 54, 56 that guide mounting 22 for vertical movement relative to frame section 20. This contributes to maximum visibility, and results in the elimination of any encumbering structure adjacent the sides of the lift truck, even with the rack in a retracted position.

Mounted on the base of the rack or load pusher is jaw mechanism 110, which is movable with the rack to and fro over the length of platen 36, and which also is movable up and down with the rack when the rack is moved vertically. Jaw mechanism 110 comprises a lower jaw member 112, which is an elongated member paralleling gripper bar 48. An upper portion 112a of member 112 (see FIGS. 4 and 6) extends to the base of the rack, and is fixedly secured thereto. Fastened to the back side of lower jaw member 112 are blocks 114, with one positioned adjacent each end of the lower jaw member. Pivotally mounted on blocks, by pivot connections 115, is an upper jaw member 116.

Lower jaw member 112 is provided with an upper clamping face 112b, containing a groove 118 running along the length thereof. The upper jaw member is provided with a clamping face 116b provided with a ridge 120. On pivotal movement of the upper jaw member about the pivot axis provided by pivot connections 115, ridge 120 moves into groove 118, to produce firm gripping contact with any pallet plated therebetween.

Power-operated means is provided for actuating the upper movable jaw member, whereby it is moved toward and away from the lower jaw member. Specifically, such means comprises a pair of double-acting rams 122 (see FIGS. 1 and 2) positioned, one adjacent one side and one adjacent the other side of the rack structure. The rod ends of these rams, indicated at 124, are pivotally connected to the upper jaw member, and the cylinder ends indicated at 126, are suitably secured to the load pusher or rack 24.

Fluid under pressure is supplied to one side of these rams, and exhausted from their opposite sides, through conduit means including conduit sections 128, 129 on opposite sides of the structure. These in turn are connected to suitable valve structure (not shown) used in controlling movement of the rams. Ram 68, and rams 100, 102, are also provided with suitable supply and exhaust conduit structure, and control valve structure, not shown in the drawings for reasons of clarity.

Describing how the apparatus described above may be employed in the handling of articles, first of all it will be assumed that a stack of articles, such as boxes, has been loaded on a suitable sheet-like pallet, such as a flexible sheet of cardboard 130. To shift this load onto platen or load-support means 36, the rack is first extended to the forward end of the platen, by extension of pantograph structures 76, and jaw members of jaw mechanism 110 are opened, by swinging them apart, so that they have the relative position shown in FIG. 5. With the jaw mechanism adjacent the edge of the sheet-like pallet, the jaw mechanism is actuated so as to close the jaw members thereof, and produce gripping contact with the pallet.

The rack may now be retracted toward the subframe or mounting 22, by collapse of the pantograph structure. This operates to slide the pallet, together with the load thereon, onto the platen, as generally indicated in FIG. 1. On continued retraction of the rack, the parts position themselves as shown in FIG. 4, with the upper jaw mechanism stacked over the gripper bar of the lower jaw mechanism.

The load now, of course, may be transported to the place desired in the usual fashion. If it is desired then to discharge the load, together with the sheet-like pallet thereunder, the upper jaw mechanism is released from the pallet, and the rack extended, which causes the load together with the pallet thereunder to be pushed off platen or load support means 36.

If it is desired to unload the stacked articles, with separation of a load from the pallet by retention of the pallet, the mechanism is operated as shown in FIGS. 4, 5, and 6. Thus, with the parts as shown in FIG. 4, the next step is to release the upper jaw mechanism from the pallet by moving the upper jaw member away from the lower jaw member. Mounting 22, the rack, and the various jaw mechanisms, are then raised relative to frame section 20, by extension of ram 64. This produces positioning of the parts relative to the platen as shown in FIG. 5. The flexibility of the pallet enables the edge of the pallet to flip under the lower jaw mechanism during upward movement of rack 24.

Upon the edge of the pallet flipping below the jaw member, mounting 22, the rack, and the jaw mechanisms are lowered by contraction of ram 64. This results in the edge of the pallet becoming clamped between pad 52 of the lower jaw member and the top of platen 36, as shown in FIG. 6. The vertical shifting of the jaw mechanism, therefore, is effective to produce a transfer of the pallet edge from one to the other of the jaw mechanisms. The edge of the pallet is now anchored by the lower jaw mechanism adjacent the rear of the load-supporting platen. If rack 24 is now extended, by extension of the pantograph structure, the load will be pushed off by the rack, with such sliding off the top of the anchored pallet.

It should be obvious that there are a number of advantages in the construction described. The construction enables articles to be unloaded, either with the pallet under them, or without the pallet, in those instances where it is desired to retain the pallet for other use. By providing the pair of jaw mechanisms, and the means for effecting the transfer described, the upper of the jaw mechanisms may be mounted on the rack for movement always with the rack.

There are no projections adjacent mast structure 12 or the lift truck, to jeopardize an operator's safety, as the entire apparatus is mounted in front of the truck. There are no telescopic members on the side of the truck acting as guides. By guiding the rack on the mounting, and by eliminating extensive guide structure on the side of the apparatus, maximum visibility of a load is always afforded.

The two jaw mechanisms occupy a stacked position, with one fitting above the other, when the rack is retracted, as shown in FIG. 4. This reduces the overall side profile of the structure, and enables the handling of the largest possible load sizes.

With the edge of a pallet gripped by the lower jaw member and the platen, the pallet is held firmly substantially entirely along the length of its edge. The pallet is held fast on platen 36 while flat and with minimum opportunity for tearing.

While an embodiment of the invention has been described, it should be obvious that changes are possible without departing from the invention. It is desired to cover all modifications and variations that would be apparent to one skilled in the art, and that come within the scope of the appended claims.

It is claimed and desired to secure by Letters Patent:

1. Article-handling mechanism for an industrial truck having an upright mast section with a carriage vertically movable thereon, said article-handling mechanism comprising a frame section adapted to be mounted on said carriage, support means providing a platform for supporting a load secured to said frame section and extending out forwardly thereof, a subframe mounted over said support means forwardly of said frame section, guide means accommodating relative vertical movement interposed between said subframe and frame section mounting the former on the latter, power-operated means interposed between said subframe and frame section for producing said relative movement, an elongated clamp means extending transversely of and over said support means secured to the base of said subframe, said power-operated means when actuated shifting said clamp means into clamping position against said support means, upright face plate means extending transversely of and disposed over said support means and in front of said subframe, extensible means mounting said face plate means on said subframe with said face plate means movable to and fro between the front and rear of said support means, and elongated transverse jaw mechanism mounted on the base of said face plate means.

2. The article-handling mechanism of claim 1, wherein said extensible means has ends mounted on said subframe and face plate means, respectively, said extensible means is extensible between its said ends, and said guide means comprises guides laterally outwardly of said extensible means on either side of said subframe.

3. The article-handling mechanism of claim 1, wherein said jaw mechanism includes a pair of cooperable elongated jaw members, and said jaw members are shifted to a position stacked above said clamp means upon movement of said face plate means to the rear of said support means.

4. Article-handling mechanism for an industrial truck having an upright mast section with a carriage movable therealong, said mechanism comprising a frame section adapted to be mounted on said carriage, support means providing a platform for supporting a load secured to said frame section and extending forwardly thereof, a vertically movable subframe mounted on said frame section above said support means, and power-operated means operatively interposed between the frame section and subframe for producing vertical movement in the subframe, jaw mechanism for clamping onto a pallet, including a pair of cooperating jaw members, relatively adjustable between clamping and release positions, operatively mounted on said subframe through an extensible member in a position above and adjacent said support means, said jaw mechanism, including its pair of jaw members, being movable upwardly with upward movement of the subframe, whereby with the jaw members in their release position and released of a pallet the jaw members may both be moved above the pallet to clear the pallet, and jaw means mounted on said subframe for vertical movement with the subframe, and operable upon movement of said subframe and when shifted downwardly against said support means to clamp a pallet released by said jaw members of the jaw mechanism against said support means.

5. Article-handling mechanism for an industrial truck having an upright mast section with a carriage movable therealong, said mechanism comprising a frame section adapted to be mounted on the carriage, support means providing a platform for supporting the load secured to said frame section and extending forwardly thereof, a vertically movable subframe mounted on said frame section above said support means, and power-operated means operatively interposed between the frame section and subframe for producing such vertical movement in the subframe, a load pusher disposed over said support means and in front of said subframe, and extensible means mounting said load pusher on the subframe with the load pusher movable to and fro between the front and rear of said support means, jaw mechanism for clamping onto a pallet, including upper and lower jaw members, relatively adjustable between clamping and release positions, mounted on said load pusher adjacent the base of said load pusher in a position above and adjacent said support means, said jaw mechanism, including its pair of jaw members, being movable upwardly with upward movement of the subframe, whereby with the jaw members in their release position and released of a pallet the members may both be moved above the pallet to clear the pallet, and jaw means mounted on the article-handling mechanism, located rearwardly of said jaw mechanism, adjustable between clamping and release positions, for clamping onto a pallet released by said jaw mechanism after upward movement of said jaw mechanism.

6. Article-handling mechanism for an industrial truck having an upright mast section with a carriage movable therealong, said handling mechanism comprising a frame section adapted to be mounted on the carriage, support means providing a platform for supporting a load secured to the frame section and extending forwardly thereof, a vertically movable subframe mounted on the frame section above the support means, and power-operated means operatively interposed between the frame section and subframe for producing such vertical movement, a load pusher disposed over said support means and in front of the subframe, and extensible means mounting the load pusher on the subframe with the load pusher being movable to and fro between the front and rear of said support means, jaw mechanism for clamping onto a pallet including a upper and a lower jaw member, relatively adjustable between clamping and release positions, mounted on the load pusher adjacent the base of the load pusher and in a position above and adjacent said support means, said jaw mechanism, including its pair of jaw members, being movable upwardly with upward movement of the subframe whereby with the jaw members in their release position and released of a pallet the members may both be moved to clear the pallet, and jaw means mounted on said subframe for vertical movement with the subframe, and operable upon movement of the subframe and when shifted downwardly against said support means to clamp a pallet released by said jaw members against said support means.

References Cited by the Examiner
UNITED STATES PATENTS

| 2,583,977 | 1/52 | Turner | 214—514 |
| 2,639,051 | 5/53 | Thomas | 214—514 |
| 2,640,611 | 6/53 | Turner | 214—510 |
| 2,727,643 | 12/55 | Maginn et al. | 214—514 |
| 2,785,818 | 3/57 | Mercier et al. | 214—514 |
| 2,787,393 | 4/57 | Horton | 214—514 |
| 2,874,862 | 2/59 | Farmer | 214—652 |
| 2,875,912 | 3/59 | Thresher et al. | 214—654 |
| 2,955,721 | 10/60 | Hepler et al. | 214—514 |
| 2,996,204 | 8/61 | Jensen | 214—514 |
| 3,034,675 | 5/62 | Quayle | 214—514 |
| 3,115,262 | 12/63 | Avery | 214—654 |

FOREIGN PATENTS 624,461  6/49  Great Britain.

HUGO O. SCHULZ, *Primary Examiner.*

MORRIS TEMIN, *Examiner.*